United States Patent
Folken et al.

(10) Patent No.: US 12,354,514 B1
(45) Date of Patent: Jul. 8, 2025

(54) DYNAMICALLY ADJUSTABLE DISPLAY

(71) Applicant: Caterpillar Inc., Deerfield, IL (US)

(72) Inventors: Keith R Folken, West Peoria, IL (US);
Jennifer Heine, Mannheim (DE);
Joshua Brian Smith, Durham, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/643,729

(22) Filed: Apr. 23, 2024

(51) Int. Cl.
G09G 3/20 (2006.01)
G06F 3/04817 (2022.01)

(52) U.S. Cl.
CPC ....... G09G 3/2003 (2013.01); G06F 3/04817 (2013.01); *G09G 2320/0666* (2013.01); *G09G 2354/00* (2013.01); *G09G 2360/144* (2013.01)

(58) Field of Classification Search
CPC ......... G09G 3/2003; G09G 2320/0666; G09G 2354/00; G09G 2360/144; G06F 3/04817
USPC ....................................................... 345/690
See application file for complete search history.

(56) References Cited

U.S. PATENT DOCUMENTS

| | | | |
|---|---|---|---|
| 5,767,852 A | 6/1998 | Keller | |
| 9,378,688 B2 | 6/2016 | Brush | |
| 10,332,437 B2 | 6/2019 | Orio | |
| 11,302,284 B2 | 4/2022 | Kogan | |
| 11,302,287 B1 | 4/2022 | Allard | |
| 11,557,266 B2 | 1/2023 | Harwell | |
| 2006/0066458 A1* | 3/2006 | Samuelsen | E01F 9/40 340/907 |
| 2007/0247641 A1* | 10/2007 | Okuma | G06F 3/04817 358/1.1 |
| 2012/0192111 A1* | 7/2012 | Hsu | G06F 3/04817 715/821 |
| 2014/0320516 A1* | 10/2014 | Son | G06F 3/04817 345/589 |
| 2016/0246475 A1* | 8/2016 | Garcia | G06T 11/001 |
| 2016/0379397 A1* | 12/2016 | Zhou | G06F 3/04883 715/822 |
| 2020/0326848 A1* | 10/2020 | Amini | G06F 3/0416 |
| 2021/0276420 A1* | 9/2021 | Couch | G06F 3/04817 |
| 2022/0147210 A1* | 5/2022 | Ochenas | G06F 3/04883 |
| 2022/0189433 A1* | 6/2022 | Grundhoefer | G09G 5/026 |
| 2022/0197483 A1* | 6/2022 | SanGiovanni | G06F 3/04817 |
| 2023/0168790 A1* | 6/2023 | Shiina | G06F 3/04845 715/815 |
| 2023/0315256 A1* | 10/2023 | Song | G06F 3/04817 715/835 |

\* cited by examiner

Primary Examiner — Tom V Sheng

(57) ABSTRACT

Systems and methods for operating a display of a device are described herein. The display is configured to adjust the hue of the display depending on the ambient light conditions around the display. To assist a user of the device in determining a priority condition of the device, the device is configured to use color contrasts to focus the attention of the user to one or more icons on the display, thus prioritizing icons relative to other, lower priority icons associated with other conditions of the device. Additionally, the contrast used can be adjusted by the user to potentially account for varying degrees of color blindness. The display can be set to one or more test contrasts, whereby a user selects the contrast that works the best for the user.

20 Claims, 8 Drawing Sheets

| 314 | 304 | 306 | 308 | 310 | 312 |
|---|---|---|---|---|---|
| #FFFFFF WHITE TEXT | #0077FF BLUE BUTTON | #2BA2FF BLUE TEXT | #004790 BLUE BUTTON PRESSED | #323232 #2A2A2A OPACITY 60% | |
| #656565 GRAY BORDER AND LINES | #00AA33 GREEN BUTTON | #00AA33 GREEN TEXT | #007900 GREEN BUTTON PRESSED | #323232 #2A2A2A OPACITY 60% | #0F8B55 GREEN SPECIAL (ECS SWITCH) |
| | #FFCD11 YELLOW BUTTON | #FFCD11 YELLOW TEXT | #AC8A00 YELLOW BUTTON PRESSED | #323232 #2A2A2A OPACITY 60% | #FFAA00 AMBER |
| #222222 DARK SECTION | #DD0000 RED BUTTON | #FF6E6E RED TEXT | #AC0000 RED BUTTON PRESSED | #323232 #2A2A2A OPACITY 60% | |
| #000000 DARK CANVAS | #353535 GRAY BUTTON | #8A8A8A GRAY TEXT | #1A1A1A GRAY BUTTON PRESSED | #323232 #2A2A2A BUTTON DISABLED | #8A8A8A GRAY TEXT |

*FIG. 3*

| 414 | 404 | 406 | 408 | 410 | 412 |
|---|---|---|---|---|---|
| #E5E5E5 LIGHT CANVAS | #E5E5E5 GRAY BUTTON | #656565 GRAY TEXT | #8A8A8A GRAY BUTTON PRESSED | #323232 #2A2A2A BUTTON DISABLED | #8A8A8A KEYBOARD BUTTON LIGHT |
| #FFFFFF LIGHT SECTION | #DD0000 RED BUTTON | #DD0000 RED TEXT | #AC0000 RED BUTTON PRESSED | #323232 #2A2A2A OPACITY 60% | |
| | #FFCD11 YELLOW BUTTON | #8F5D00 YELLOW TEXT | #AC8A00 YELLOW BUTTON PRESSED | #323232 #2A2A2A OPACITY 60% | #FFAA00 AMBER |
| #8A8A8A GRAY BORDER AND LINES | #00AA33 GREEN BUTTON | #007900 GREEN TEXT | #007900 GREEN BUTTON PRESSED | #323232 #2A2A2A OPACITY 60% | #0F8B55 GREEN SPECIAL (ECS SWITCH) |
| #FFFFFF WHITE TEXT | #0077FF BLUE BUTTON | #005DE5 BLUE TEXT | #004790 BLUE BUTTON PRESSED | #323232 #2A2A2A OPACITY 60% | |

*FIG. 4*

DYNAMICALLY ADJUSTABLE DISPLAY

TECHNICAL FIELD

The present disclosure relates generally to operating a device, and more specifically, to the use of a dynamically adjustable display.

BACKGROUND

Devices, such as work machines or generator sets, for example, often include one or more displays that assist a user to control the operation of the devices. A display can include a graphical user interface that receives command inputs from the user and outputs one or more indications to provide information to the user. For example, the command inputs can include, but are not limited to, speed controls, maneuvering controls, operation controls to control one or more features of the particular type of work machine being used such as a bucket, drill, or scoop. In other examples, the indications can include, but are not limited to, the operational condition of the device (e.g., shut down or operational), engine/motor operational modes, climate control status, work machine speed, battery voltage, engine or motor temperatures, fluid temperatures, and fluid pressures. The display can also include additional information such as warning lights indicating a condition of a component of the work machine or genset.

The information and control indications on the displays can be displayed thereon the display using various symbols and/or colors. During use, it may be helpful to the user to be able to differentiate the symbols and/or controls using various color schemes. Some efforts have been made regarding the readability of a display. For example, U.S. Pat. No. 11,557,266 to Harwell (hereinafter referred to as "the '266 patent'") discloses a display that uses adaptive recoloring of the content rendered in the display. The '266 patent describes the use of different color palettes, whereby an optimized color palette is used in lieu of a preliminary color palette by using color palette constraints. However, the optimized color palette system of the '266 patent can have various deficiencies. For example, moving between different color palettes can affect a user's perception of the importance of the information being displayed. Further, the optimized palettes of the '266 patent can affect how a user views the display in various lighting conditions and can be difficult to view based on various levels of a user's ability to detect shades of colors.

Examples of the present disclosure are directed to overcoming deficiencies of such systems.

SUMMARY

In one aspect of the present disclosure, a device includes a display having a first hue configuration and a second hue configuration, the display comprising a display background having displayed thereon a plurality of elements displayed in a first relative contrast, wherein at least one of the plurality of elements comprises a first contrast ratio between an icon and an icon background of the at least one of the plurality of elements and a second contrast ratio between the icon background and the display background, and wherein the first contrast ratio and the second contrast ratio are a same or a similar contrast ratio, a display controller comprising, a memory storing computer-executable instructions, and a processor in communication with the memory, the computer-executable instructions causing the processor to perform acts comprising, detecting an environmental condition, adjusting the display to the first hue configuration or the second hue configuration in response to the environmental condition, receiving an input that a first icon of the plurality of elements is a priority to an operation of the device, and modifying the display from the first relative contrast to a second relative contrast, wherein in the second relative contrast, the first icon of the plurality of elements has a higher contrast relative to at least a remaining portion of the plurality of elements In another aspect of the present disclosure, a method of operating a display of a device includes detecting an environmental condition, adjusting the display to a first hue configuration or a second hue configuration in response to the environmental condition, receiving an input that a first icon of a plurality of elements is a priority to an operation of the device, and modifying the display from a first relative contrast to a second relative contrast, wherein in the second relative contrast, the first icon of the plurality of elements has a higher contrast relative to at least a remaining portion of the plurality of elements.

In a still further aspect of the present disclosure, a non-transitory computer-readable media has stored thereon computer-executable instructions that, when executed by one or more processors, cause the one or more processors to perform operations comprising detecting a first machine condition, displaying a first element associated with the first machine condition on a display having a display background, wherein the first element comprises a first icon and a first icon background, and wherein a first contrast ratio between the first icon and the first icon background is a same or a similar contrast ratio to a second contrast ratio between the first icon background and the display background, detecting a second machine condition, and displaying a second element associated with the second machine condition on the display having the display background, wherein the second element comprises a second icon and a second icon background, and wherein a third contrast ratio between the second icon and the second icon background is the same or similar to a fourth contrast ratio between the second icon background and the display background.

BRIEF DESCRIPTION OF DRAWINGS

FIGS. 3 and 4 are illustrations showing hue configurations for control inputs or icons of a display, in accordance with various examples of the presently disclosed subject matter.

DETAILED DESCRIPTION

Figure 1:
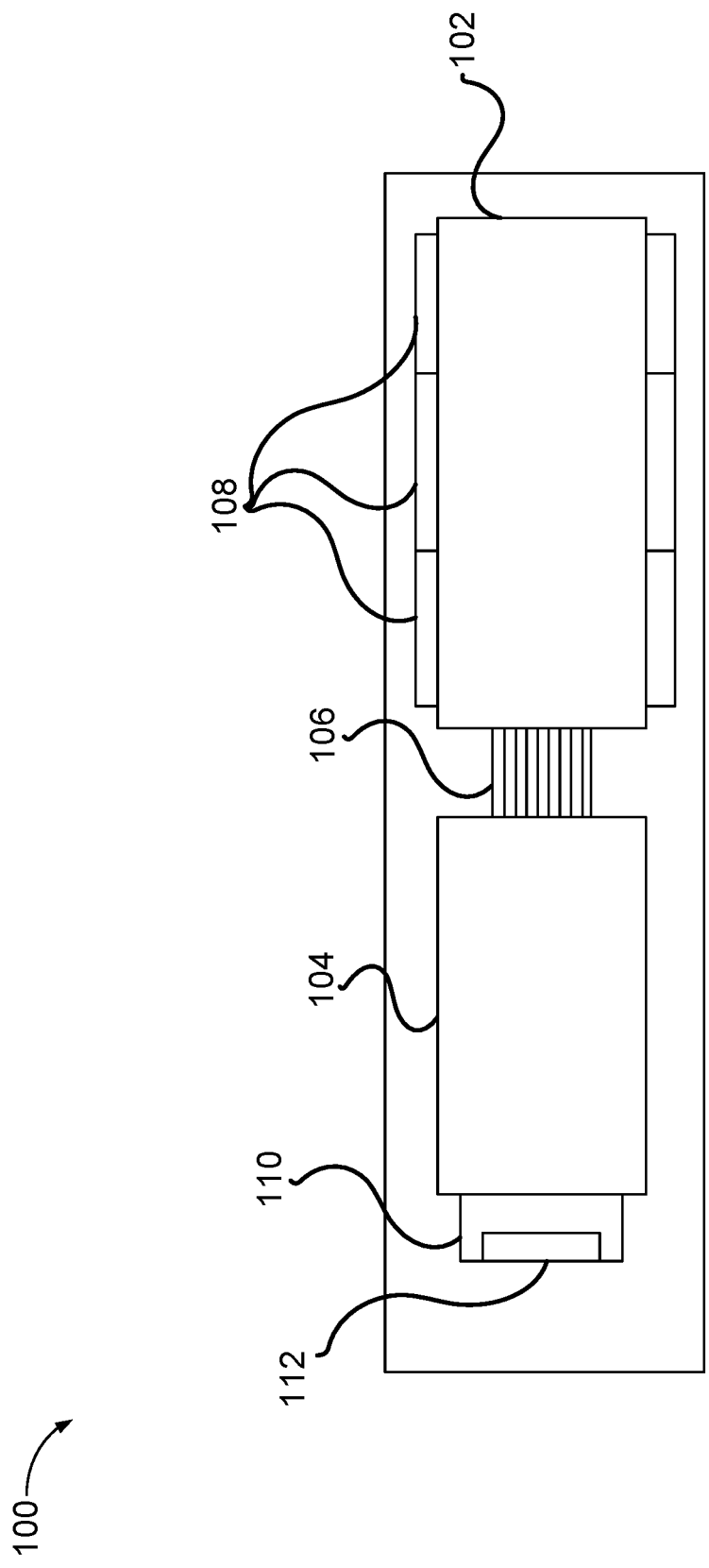
FIG. 1 is an upper perspective schematic illustration of a generator set having a dynamically adjustable display, in accordance with one or more examples of the present disclosure.

Wherever possible, the same reference numbers will be used throughout the drawings to refer to the same or like parts. Aspects of the presently disclosed subject matter may be used in various devices, including vehicles, work machines, as well as other devices such as, but not limited to, generator sets used to generate electrical power. It should be noted that the presently disclosed subject matter is not limited to any particular implementation of a dynamically adjustable display. FIG. 1 is an upper perspective schematic illustration of a generator set (genset) 100, which is a device having a dynamically adjustable display, in accordance with one or more examples of the present disclosure. The genset 100 can be used at various locations to generate electrical power using an internal combustion engine, solar powered motor, and the like. The electrical power generated by the genset 100 can be provided directly to electrical loads or stored using one or more batteries. Referring to FIG. 1, the genset 100 includes an engine 102 operatively coupled to an alternator 104 by shaft 106. The engine 102 can be an internal combustion engine that uses various forms of fuels such as, but not limited to, gasoline, diesel, alternative fuels such as methanol and ethanol, or various combinations thereof. As noted above, in some examples, the rotational power delivered to the shaft 106 may be provided by other types of devices such as solar-powered motors.

In FIG. 1, rotational power of the engine 102 rotates the shaft 106, which in turn is rotated in an electromagnetic field provided by the alternator 104, thereby producing electrical power. In some examples, the alternator 104 is a 400V, 3500 kVA alternator, although other sizes of alternator may also be used and are considered to be within the scope of the present disclosure. The electrical power generated by the alternator 104 is stored at least in part using batteries 108. The genset 100 further includes a genset control panel 110 configured to control operation of the genset 100. The control panel 110 is also configured to be used to control one or more operations of the genset 100 as well as to provide information related to the operation of the genset 100 such as, but not limited to, conditions of the engine 102, usage of the batteries 108, temperatures and/or pressures relating to one or more components of the genset 100, a power output of the genset 100, and other information. The control panel 110 includes a display 112 that is dynamically adjustable. The display 112 can include one or more elements having a first contrast ratio between an icon and an icon background of the at least one of the plurality of elements and a second contrast ratio between the icon background and the display background, and wherein the first contrast ratio and the second contrast ratio are the same, described by way of example in FIG. 2, below.

Figure 2:
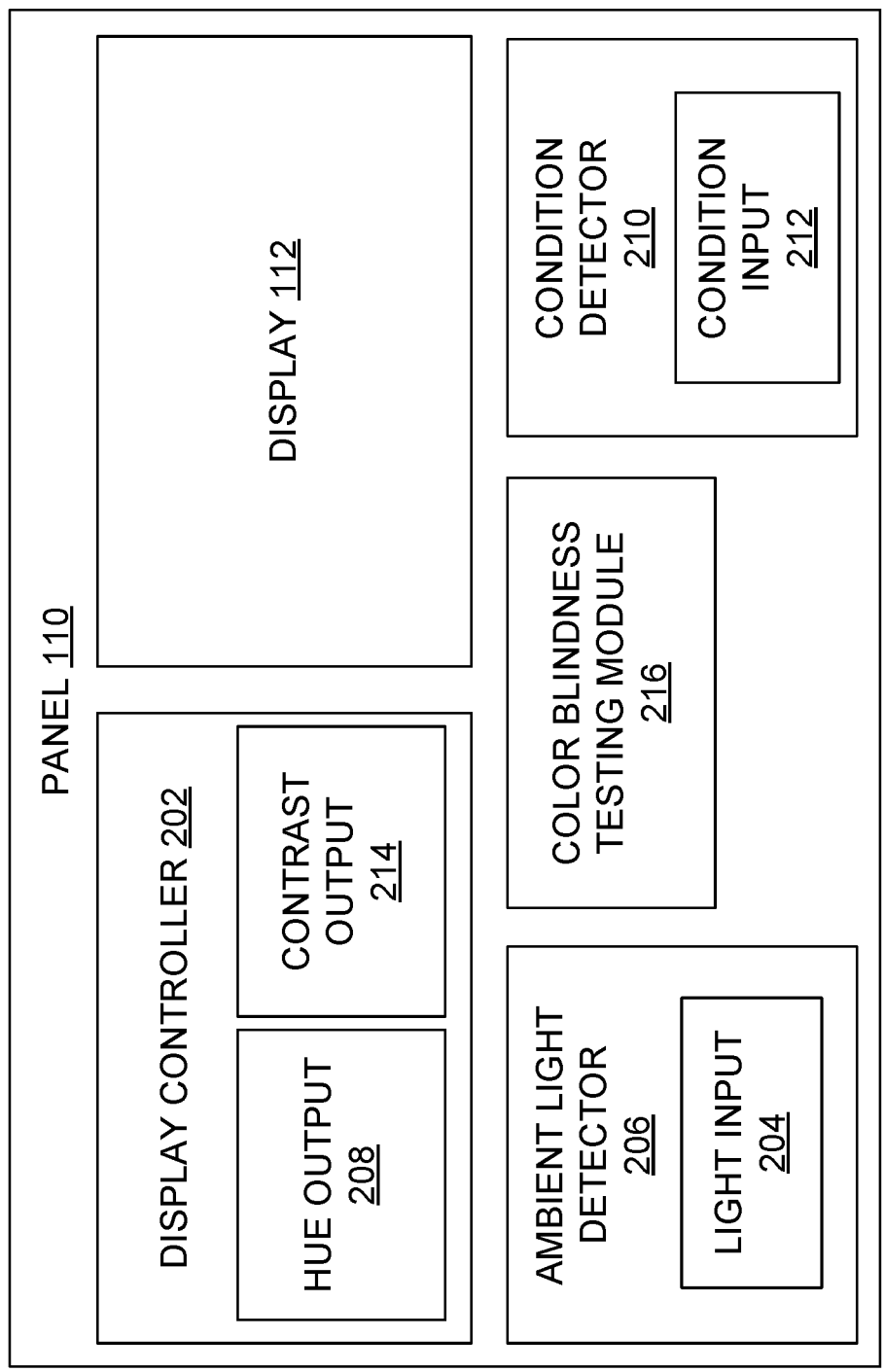
FIG. 2 is a side view schematic illustration of a control panel having a dynamically adjustable display, in accordance with one or more examples of the present disclosure.

FIG. 2 is a side view schematic illustration of the control panel 110 of the genset 100 with the display 112, in accordance with one or more examples of the presently disclosed subject matter. The genset 100 may be used in different environmental conditions, such as environmental conditions of light (morning, noon, day, evening, overcast, and the like) that impart a different ambient light condition on the face of the display 112. In some examples, the display 112 has more than one hue configuration, whereby the hue configuration is based on a determination of ambient light conditions of the display 112. As used herein, "hue" means a degree of lightness. Further, as used herein, an "element" may include an icon, a background of an icon, and other displayed images. The hue of the display 112 can be based on a requirement that icons in the display 112 be recognizable or discernable in various light conditions effecting the display 112 (e.g., low light conditions such as the morning or evening and high light conditions such as midday).

To change the hue of the display 112, and control other aspects of the display 112 as described in more detail below, the genset 100 includes a display controller 202. The display controller 202 may be a computer having a memory storing computer-executable instructions and one or more processors in communication with the memory, described in more detail in FIG. 7. The computer-executable instructions are used to cause the processor of the display controller 202 to perform various operations (or acts). For example, the display controller 202 receives a light input 204 from an ambient light detector 206 installed on the genset 100. The ambient light detector 206 measures a brightness of light that may strike the display 112. The ambient light detector 206 uses the measurement to output the light input 204 to the display controller 202. The display controller 202 receives the light input 204 and determines if the light input 204 requires an adjustment of the display 112 from one hue configuration to another hue configuration, illustrated by way of example in FIGS. 3 and 4.

Figure 5:
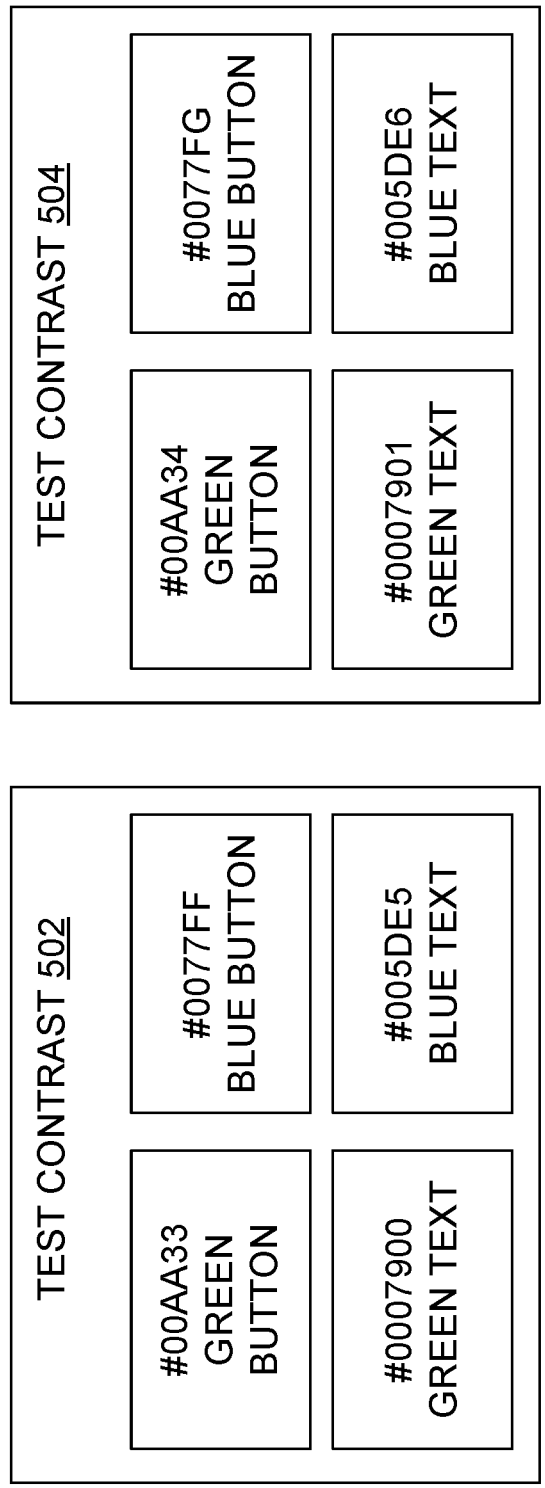
FIG. 5 illustrates test contrasts that may be used to select color codes to indicate priority levels, in accordance with various examples of the presently disclosed subject matter.

FIGS. 3 and 4 are illustrations showing hue configurations for control inputs or icons of the display 112, examples of which are explained in more detail in FIG. 5, in accordance with various examples of the presently disclosed subject matter. The hue configuration 302 of FIG. 3 is an example hue configuration that may be used for relatively low lighting conditions, whereas the hue configuration 402 of FIG. 4 may be used for relatively bright lighting conditions. The hues (or colors in this context) of various control inputs or icons are illustrated using their associated six (6) digit color code, sometimes referred to as "hexadecimal color notation." The hue configuration 302 of FIG. 3 includes button color codes 304 for buttons (or icons), text color codes 306, selection color codes 308, disabled button color codes 310, and special color codes 312. It should be noted that the term "button" may include icons that are physically or digitally selectable as well as icons that are used to display information (such as speed, battery power, and the like). It should be noted that the color codes described herein are merely an example, as other color codes may be used. Additionally, although two hue configurations are described, the presently disclosed subject matter is not limited to two hue configurations, as other hue configurations may be used in addition to the hue configurations 302 and 402 described herein.

In the hue configuration 302, gray buttons are displayed on the display 112 using the color code #353535, red buttons are displayed on the display 112 using the color code #DD0000, yellow buttons are displayed on the display 112 using the color code #FFCD11, and so forth. In another example, text displayed in those buttons may use the text color codes 306. In the hue configuration 302, gray text is displayed on the display 112 using the color code #8A8A8A, red text is displayed on the display 112 using the color code #FF6E6E, yellow text is displayed on the display 112 using the color code #FFCD11, and so forth. If the button is a selectable button, the selection color codes 308 for the buttons may be used.

In the hue configuration 302, selected green buttons are displayed on the display 112 using the color code #007900, selected blue buttons are displayed on the display 112 using the color code #004790, and so forth. Disabled buttons may use the disabled button color codes 310, which include a color and an opacity value. Display color codes 314 are used to control the overall look of the display 112. For example, in FIG. 3, a dark canvas (i.e., dark background) color code #000000 is used for low lighting conditions, sections of the display 112 have color code #222222, gray borders and lines use color code #656565, and text is white with a color code of #FFFFFF. If the display experiences relatively brighter light conditions, the hue configuration may change from hue configuration 302 of FIG. 3 to a hue configuration 402 as illustrated in FIG. 4.

As noted above, the hue configuration 402 of FIG. 4 may be used for relatively bright lighting conditions. The hues (or colors in this context) of various control inputs or icons are illustrated using their associated six (6) digit color code. The hue configuration 402 of FIG. 4 includes button color codes 404 for buttons (or icons), text color codes 406, selection color codes 408, disabled button color codes 410, and special color codes 412. In the hue configuration 402, gray buttons are displayed on the display 112 using the color code #E5E5E5, red buttons are displayed on the display 112 using the color code #DD0000, yellow buttons are displayed on the display 112 using the color code #FFCD11, and so forth. In another example, text displayed may use the text color codes 406. In the hue configuration 402, gray text is displayed on the display 112 using the color code #656565, red text is displayed on the display 112 using the color code #DD0000, yellow text is displayed on the display 112 using the color code #8F5D00, and so forth.

If the button is a selectable button, the selection color codes 408 for the buttons may be used. In the hue configuration 402, selected green buttons are displayed on the display 112 using the color code #007900, selected blue buttons are displayed on the display 112 using the color code #004790, and so forth. Disabled buttons may use the disabled button color codes 410, which include a color and an opacity value. Display color codes 414 are used to control the overall look of the display 112. For example, in FIG. 4, a dark canvas (i.e., dark background) color code #000000 is used for low lighting conditions, sections of the display 112 have color code #222222, gray borders and lines use color code #656565, and text is white with a color code of #FFFFFF.

Returning to FIG. 2, the display controller 202 receives the light input 204 and determines which hue configuration, e.g., the hue configuration 302 or the hue configuration 402, the display 112 is to use. If the light input 204 indicates an ambient brightness at or above a predetermined lux or luminance, the display controller 202 outputs a hue output 208 to cause the display 112 to use the hue configuration 402 of FIG. 4. If the light input 204 indicates an ambient brightness below a predetermined lux or luminance, the display controller 202 outputs the hue output 208 to cause the display 112 to use the hue configuration 302 of FIG. 3.

Along with using different hue configurations, in some examples, the display controller 202 also changes the color codes of various text and buttons (icons) to indicate a relative priority of the information being displayed. In some examples, the color codes are selected based on a relative contrast between one color code indicating one level of priority and another color code indicating another level of priority. A higher level of priority may have a relatively higher contrast relative to a lower priority of a remaining portion of icons. In still further examples, the relative contrast may be selected to account for various levels of colorblindness. For example, in the hue configuration 402 of FIG. 4, blue text uses a color code of #005DE5 and red text uses a color code of #DD0000. In this example, the blue text may be used for low priority conditions and red text may be used for higher priority conditions. The color codes for the blue and red text may be designed to provide a contrast that may be perceptible to operators with little to no color blindness and to operators with various degrees of color blindness. The specific color codes used can be based on default values or may be determined using test contrasts, as described in FIG. 5.

FIG. 5 illustrates test contrasts 502 and 504 that may be used to select color codes to indicate priority levels, in accordance with various examples of the presently disclosed subject matter. As noted above, in some examples, the display controller 202 may instruct the display 112 to change a color code of a text or button (icon) from one color code to another color code based on a condition of the genset 100. The color codes may be designed to provide a degree of contrast which may be based on default values or may be configured using test contrasts 502 and 504. The test contrasts 502 and 504 are designed to test an operator to determine which color codes are best perceived by the operator, similar to the manner in which eyesight is tested. On the display 112, an operator is presented with the test contrast 502 and then the test contrast 504. The operator selects which test contrast is best perceived by the operator. The testing process can continue in an iterative manner until the operator determines that a particular test contrast is best suited for the operator. Returning to FIG. 2, a color blindness testing module 216 implements the testing process described in FIG. 5. The display controller 202 adjusts the values of the hue output 208 based on the results received from the color blindness testing module 216. The testing process can be performed using both the hue configurations so that the operator perceives the priority contrast levels of the conditions when the display 112 uses the various hue configurations.

As noted above, text and buttons may be used to indicate machine conditions of the genset 100. A condition can include, but is not limited to, a battery charge, an oil pressure, a temperature of a component, a warning, a required input, and the like. In some configurations, the display controller 202 uses the various color codes to provide a prioritized contrast of a button to draw a user's attention to a particular button and/or to indicate a level of caution or warning associated with a particular condition. Thus, in these examples, the genset 100 includes a condition detector 210 detects conditions from various sensors located on the genset 100. These sensors can include sensors to detect various conditions, such as those described above (e.g., a battery charge, an oil pressure, a temperature of a component, a warning, a required input, and the like). The condition detector 210 outputs a condition input 212 to the display controller 202. The display controller 202 receives the condition input 212 and determines if the condition input 212 requires a modification of a contrast of the button or text associated with the condition to indicate a priority of the condition. A condition may have low, medium, and high priority levels. The priority levels may be designed to draw the attention of a user to a particular area of the display.

Figure 6:
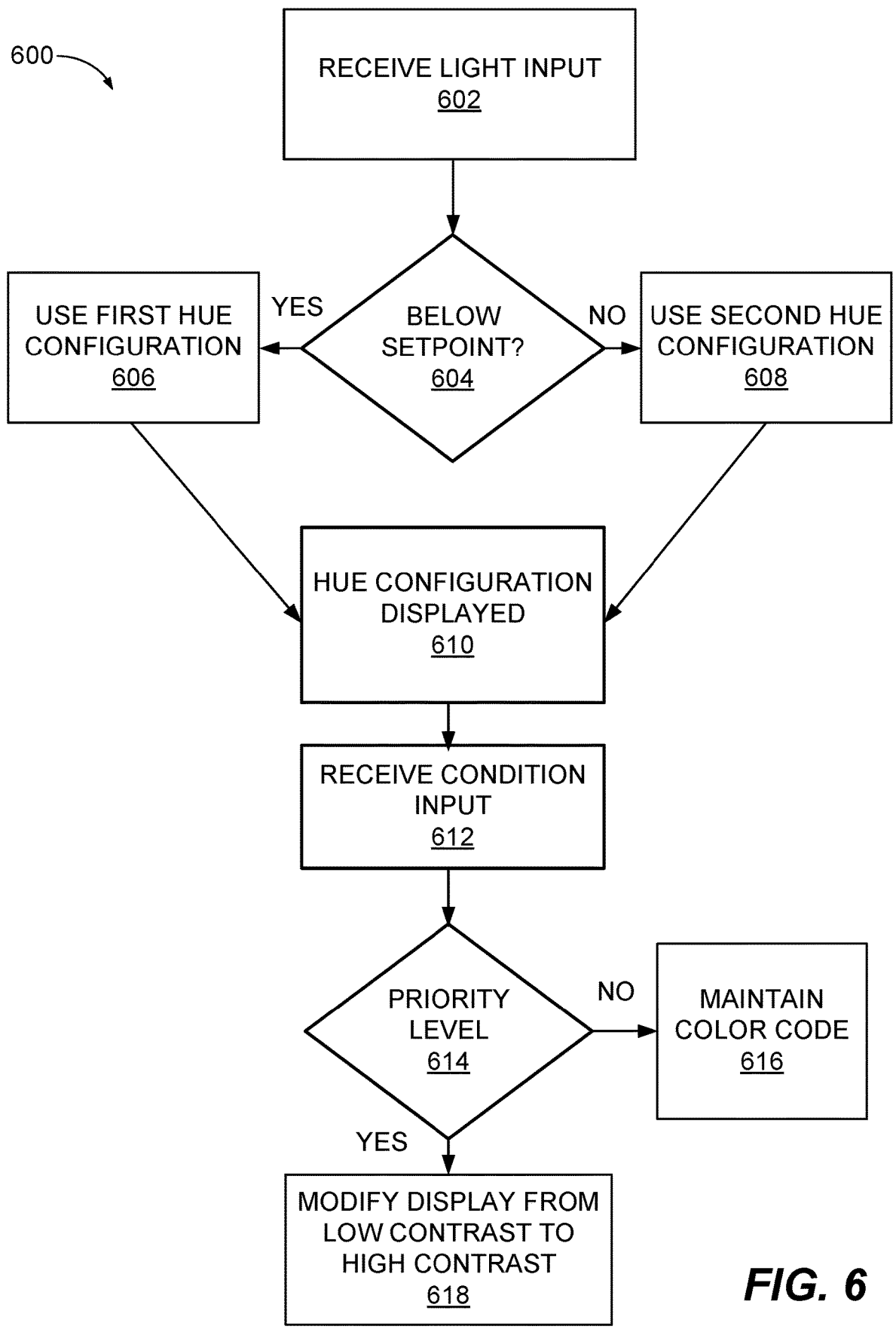
FIG. 6 illustrates a method for controlling a hue configuration and a color contrast used in a display, in accordance with various examples of the presently disclosed subject matter.

For example, the machine condition detected by the condition detector 210 may be a battery charge level, whereby the battery is used to power the genset 100. When the battery is fully charged, the condition of the battery may not be a high priority requiring some action by or the attention of an operator of the genset 100. Thus, in this situation, the display controller 202 may determine that the priority is a low priority and that the color of the battery charge icon should be green. The display controller 202 may output a contrast output 214 to the display 112 to cause the display 112 to use the color code #00AA33 for the battery charge icon using hue configurations 302 or 402. If the battery charge falls below a predetermined charge level but is a predetermined low level, the condition of the battery may not be a high priority requiring some action by or the attention of an operator of the genset 100 but the charge level may be at a level to draw the attention of the operator. Thus, in this situation, the display controller 202 may determine that the priority is a medium priority and that the color of the icon should be yellow. The display controller 202 may output the contrast output 214 to the display 112 to use the color code #FFCD11 for the battery charge icon using hue configurations 302 or 402. If the battery charge falls below a predetermined low level, the condition of the battery may require some action by or the attention of an operator of the genset 100. Thus, in this situation, the display controller 202 may determine that the priority is a high priority and that the color of the icon should be red. The display controller 202 may output the contrast output 214 to the display 112 to use the color code #DD0000 for the battery charge icon using hue configurations 302 or 402. FIG. 6 describes in more detail a process for determining a color contrast.

FIG. 6 illustrates a method 600 for controlling a hue configuration and a color contrast used in the display 112, in accordance with various examples of the presently disclosed subject matter. The method 600 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 600 commences at step 602, wherein the display controller 202 receives the light input 204 from the ambient light detector 206. The light input 204 indicates a brightness of ambient light on the display 112.

At step 604, the display controller 202 determines if the brightness is below a setpoint that requires a first hue configuration, such as the hue configuration 302 of FIG. 3 used in low light conditions, or a second hue configuration, such as the hue configuration 402 of FIG. 4 used in relatively brighter light conditions such as daytime. If at step 604 the display controller 202 determines the brightness is below a setpoint, at step 606, the display controller 202 issues the hue output 208 to instruct the display 112 to use the hue configuration 302. If at step 604 the display controller 202 determines the brightness is at or above a setpoint, at step 608, the display controller 202 issues the hue output 208 to instruct the display 112 to use the hue configuration 402. At step 610, the display 112 has received the hue output 208 and is implementing the hue configuration determined at step 604.

At step 612, the display controller 202 receives the condition input 212 from the condition detector 210 indicating a status of a condition of the genset 100. As noted above, conditions can include, but are not limited to, oil temperature, oil pressure, engine warning or fault signals, and the like.

At step 614, the display controller 202 determines a level of priority associated with the condition. The priority can be based on various factors such as a condition that effects the working condition of the genset 100, safety, and other factors. The priority levels can vary, but may include a low priority, a medium priority, and a high priority. In some examples, a color contrast using color codes is used to indicate the relative level of priority. If at step 614 the display controller 202 determines that the condition is not a high priority, is the same priority relative to another condition, or is not a change from a previously determined priority, at step 616, the display controller 202 maintains the current color code used for the button (or icon) or text associated with the condition. If at step 614 the display controller 202 determines that the condition is not a high priority or is not a change from a previously determined priority, at step 618, the display controller 202 issues the contrast output 214 to modifying the color code of the button (or icon) or text associated with the condition to the priority level determined at step 614 so that the higher priority has a higher contrast relative to lower priority conditions for the other buttons (icons) associated with other conditions. In some examples, the display controller 202 issues the contrast output 214 to change the color code of various elements on a display to maintain one or more contrast ratios, explained in FIG. 7.

Figure 7:
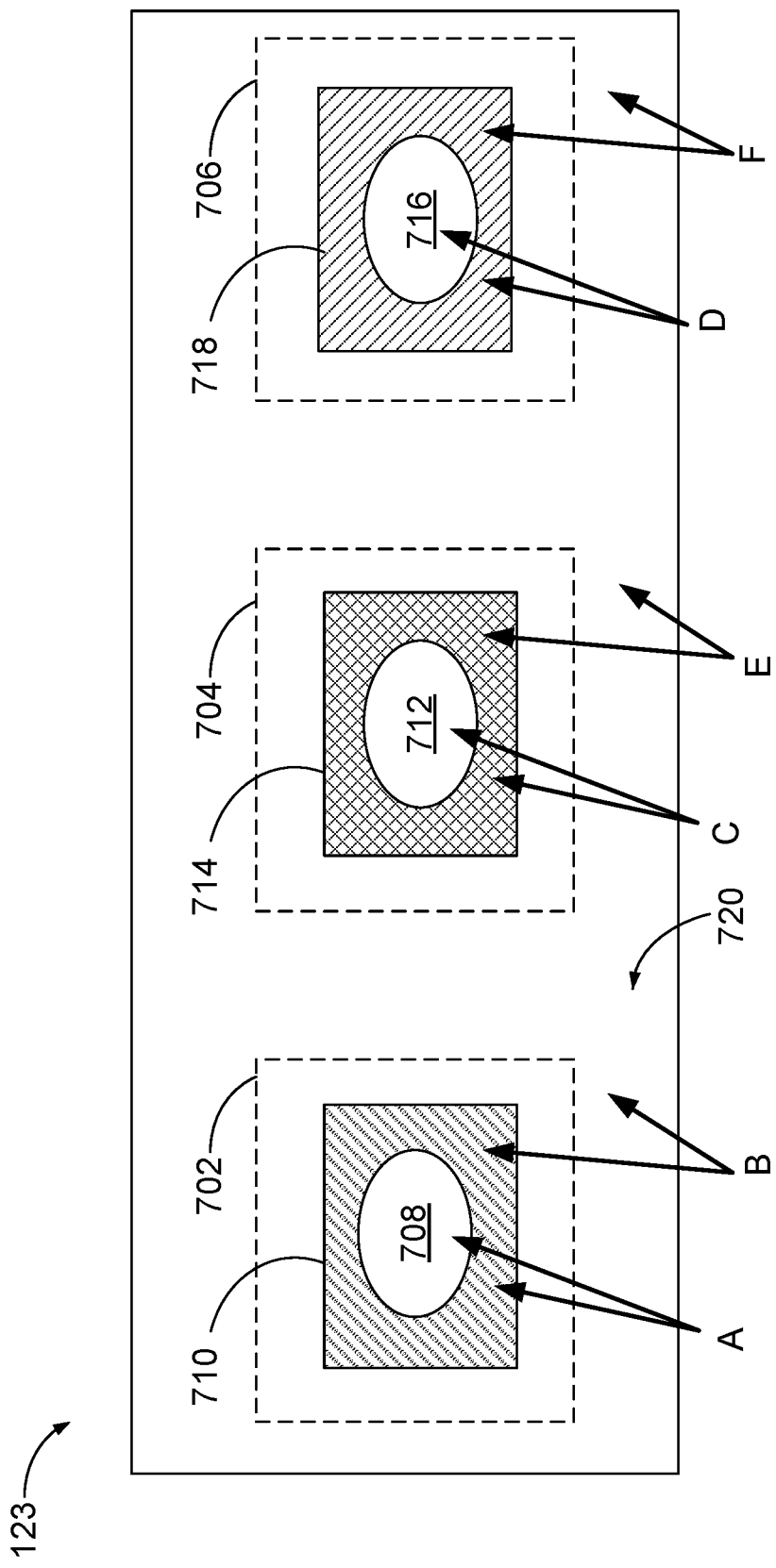
FIG. 7 illustrates a display in which contrast ratios are maintained within portions of an element displayed on the display, according to some examples of the presently disclosed subject matter.

FIG. 7 illustrates the display 112 in which contrast ratios are maintained within portions of an element displayed on the display 112, according to some examples of the presently disclosed subject matter. Illustrated in the display 112 of FIG. 7 are elements 702, 704, and 706. In the example, illustrated in FIG. 7, the element 702 is displayed in the display 112 to notify a user viewing the display 112 that the machine condition represented by the element 702 is in a standard or default condition, such as an engine temperature within a predetermined temperature range. The element 704 is displayed in the display 112 to notify a user viewing the display 112 that the machine condition represented by the 702 element is in a non-default or alarm condition but not in a standard or default condition, as would be represented by the element 702. For example, the element 704 can be displayed if the engine temperature is elevated above the predetermined range of the element 702 but not high enough to be an alarm condition. The element 706 is displayed in the display 112 to notify a user viewing the display 112 that the machine condition represented by the 702 and 704 elements is in an alarm or emergency condition, such as an engine temperature that has exceeded a high temperature threshold. It should be noted that other definitions of conditions may be used and are considered to be within the present disclosure. It should be further noted that, although illustrated in FIG. 7 as being displayed together, in some examples, the elements 702, 704, and 706 may be displayed only when the condition associated with the particular element is occurring. For example, the element 706 may only be displayed if the emergency or alarm condition is occurring.

Each of the elements may include portions, such as an icon and icon background. As used herein, an "icon background" describes a portion of the display 112 that visibly differentiates the element from a display background 123 of the display 112. The element 702 is displayed with an icon 708 representing the condition associated with the element 702 (e.g., a bell, thermometer, gas gauge, battery indicator, etc.) and an icon background 710 to provide a background for the icon 708. The element 704 is displayed with an icon 712 representing the condition associated with the element 704 (e.g., a bell, thermometer, gas gauge, battery indicator, etc.) and an icon background 714 to provide a background for the icon 712. The element 706 is displayed with an icon 716 representing the condition associated with the element 706 (e.g., a bell, thermometer, gas gauge, battery indicator, etc.) and an icon background 718 to provide a background for the icon 716. In some examples, it may be preferable that, regardless of the particular element being displayed, that a contrast ratio between different portions of the elements is maintained. As used herein, a "contrast ratio" is defined to be ratio of the relative luminance of a lighter color to the relative luminance of a darker color. An example equation is (L1+0.05)/(L2+0.05), where L1 is the relative luminance of the lighter of the colors, and. L2 is the relative luminance of the darker of the colors. In some examples, the contrast ratio can range from 1 to 21, sometimes written as 1:1 to 21:1.

The display 112 in FIG. 7 is configured to have the same or similar contrast ratios, maintaining the same or similar contrast ratios for various parts of the elements even if different colors are used for different elements. As used herein, a "similar contrast ratio" is a contrast ratio having a lighter relative luminance at or within 2 of another contrast ratio. For example, a contrast ratio of 10:1 is a similar contrast ratio compared to a contrast ratio of 8:1 but is not similar to the contrast ratio of 5:1. Continuing with FIG. 7, contrast ratio A is the contrast between the icon 708 and the icon background 710 and contrast ratio B is the contrast between the icon background 710 and a background 720 of the display 112. In this example, the icon 708 may be color FFFFFF and the icon background 710 may be color 353535, resulting in a contrast A of 12.27:1. Further, because the background 720 is black, the contrast ratio B may be 1.71:1.

Within an element, the same or similar contrast ratios may be maintained even if the colors are different. Continuing with FIG. 7, the contrast ratio C is the contrast between the icon 712 and the icon background 714 and contrast ratio E is the contrast between the icon background 714 and the background 720. In this example, the icon 712 may be color 000000 and the icon background 714 may be color FFAA00, resulting in a contrast ratio of 11:1. Similarly, the contrast ratio E is also 11:1, which is the same as the contrast ratio C. Thus, within the element 704, the different portions of the element 704, such as the icon 712 and the icon background 714, have the same contrast ratios. In a similar manner, the contrast ratio D is the contrast between the icon 716 and the icon background 718 and contrast ratio F is the contrast between the icon background 714 and the background 720. In this example the icon 716 may be color 000000 and the icon background 718 may be color FA0000, resulting in a contrast ratio of 5.06:1. Similarly, the contrast ratio F is also 5.06:1, which is the same as the contrast ratio D. Thus, within the element 706, the different portions of the element 706, such as the icon 716 and the icon background 718, have the same contrast ratios. Thus, in these and other examples, as a condition is displayed using different colors based on the condition, certain contrast ratios may be maintained between the elements of the element.

Figure 8:
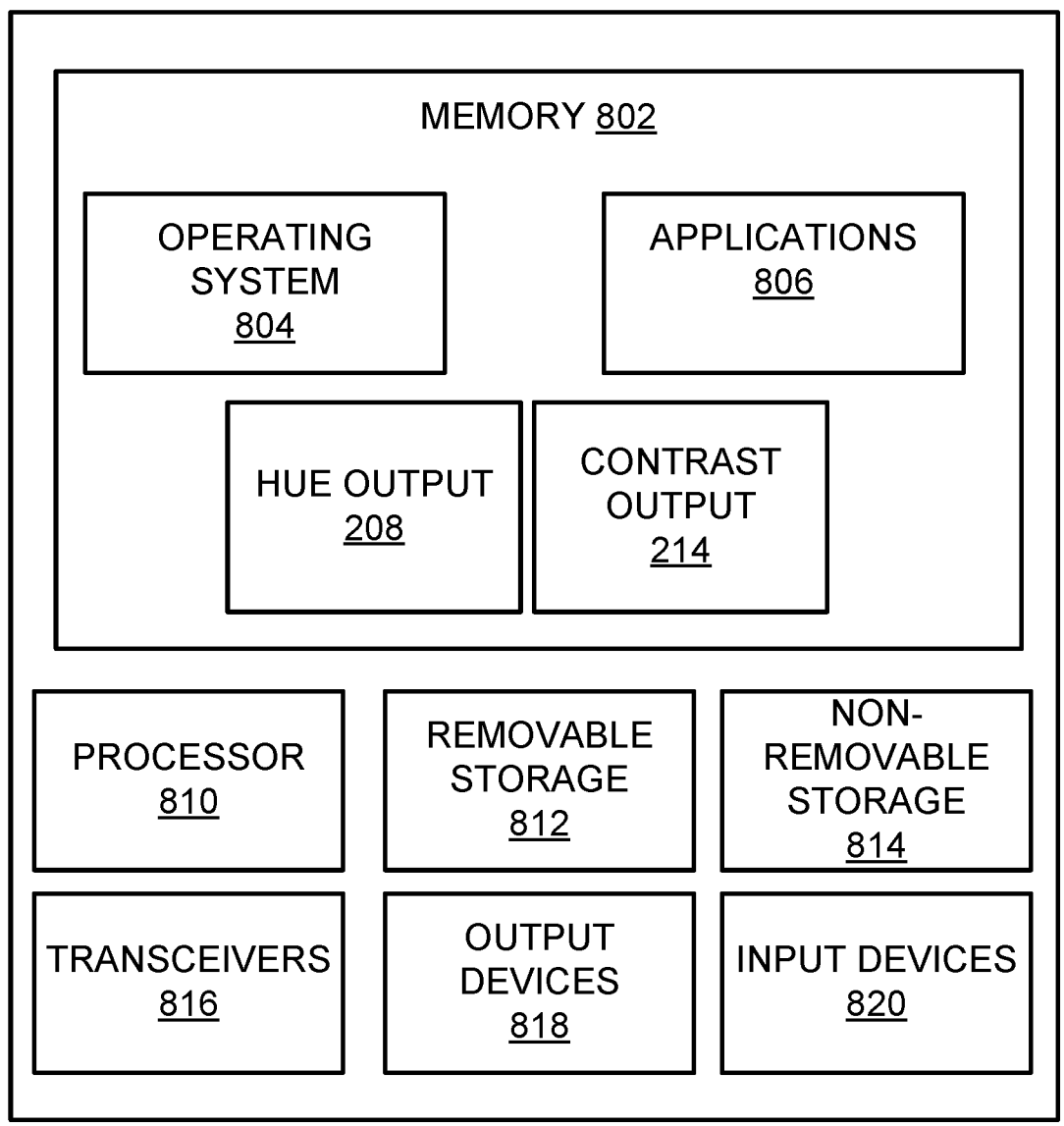
FIG. 8 depicts a component level view of a display controller for use with the systems and methods described herein, in accordance with various examples of the presently disclosed subject matter.

FIG. 8 depicts a component level view of the display controller 202 for use with the systems and methods described herein, in accordance with various examples of the presently disclosed subject matter. The display controller 202 could be any device capable of providing the functionality associated with the systems and methods described herein. The display controller 202 can comprise several components to execute the above-mentioned functions. The display controller 202 may be comprised of hardware, software, or various combinations thereof. As discussed below, the display controller 202 can comprise memory 802 including an operating system (OS) 804 and one or more standard applications 806. The standard applications 806 may include applications that generate the hue output 208 and the contrast output 214.

The display controller 202 can also comprise one or more processors 810 and one or more of removable storage 812, non-removable storage 814, transceiver(s) 816, output device(s) 818, and input device(s) 820. In various implementations, the memory 802 can be volatile (such as random access memory (RAM)), non-volatile (such as read only memory (ROM), flash memory, etc.), or some combination of the two. The memory 802 can include data pertaining to the light input 204 received from the ambient light detector 206, the condition input 212 received from the condition detector 210, and/or input received from the color blindness testing module 216.

The memory 802 can also include the OS 804. The OS 804 varies depending on the manufacturer of the display controller 202. The OS 804 contains the modules and software that support basic functions of the display controller 202, such as scheduling tasks, executing applications, and controlling peripherals. The OS 804 can also enable the display controller 202 to send and retrieve other data and perform other functions.

The display controller 202 can also comprise one or more processors 810. In some implementations, the processor(s) 810 can be one or more central processing units (CPUs), graphics processing units (GPUs), both CPU and GPU, or any other combinations and numbers of processing units. The display controller 202 may also include additional data storage devices (removable and/or non-removable) such as, for example, magnetic disks, optical disks, or tape. Such additional storage is illustrated in FIG. 8 by removable storage 812 and non-removable storage 814.

Non-transitory computer-readable media may include volatile and nonvolatile, removable and non-removable tangible, physical media implemented in technology for storage of information, such as computer readable instructions, data structures, program modules, or other data. The memory 802, removable storage 812, and non-removable storage 814 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the display controller 202. Any such non-transitory computer-readable media may be part of the display controller 202 or may be a separate database, databank, remote server, or cloud-based server.

In some implementations, the transceiver(s) 816 include any transceivers known in the art. In some examples, the transceiver(s) 816 can include wireless modem(s) to facilitate wireless connectivity with other components, the Internet, and/or an intranet. Specifically, the transceiver(s) 816 can include one or more transceivers that can enable the display controller 202 to send the hue output 208 and the contrast output 214. Thus, the transceiver(s) 816 can include multiple single-channel transceivers or a multi-frequency, multi-channel transceiver to enable the display controller 202 to send and receive video calls, audio calls, messaging, etc. The transceiver(s) 816 can enable the display controller 202 to connect to multiple networks including, but not limited to 2G, 3G, 4G, 5G, and Wi-Fi networks. The transceiver(s) 816 can also include one or more transceivers to enable the display controller 202 to connect to future (e.g., 6G) networks, Internet-of-Things (IoT), machine-to-machine (M2M), and other current and future networks.

The transceiver(s) 816 may also include one or more radio transceivers that perform the function of transmitting and receiving radio frequency communications via an antenna (e.g., Wi-Fi or Bluetooth®). In other examples, the transceiver(s) 816 may include wired communication components, such as a wired modem or Ethernet port, for communicating via one or more wired networks. The transceiver(s) 816 can enable the display controller 202 to facilitate audio and video calls, download files, access web applications, and provide other communications associated with the systems and methods, described above.

In some implementations, the output device(s) 818 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 818 can also include speakers, or similar devices, to play sounds or ringtones when an audio call or video call is received. Output device(s) 818 can also include ports for one or more peripheral devices, such as headphones, peripheral speakers, or a peripheral display.

In various implementations, input device(s) 820 include any input devices known in the art. For example, the input device(s) 820 may include a camera, a microphone, or a keyboard/keypad. The input device(s) 820 can include a touch-sensitive display or a keyboard to enable users to enter data and make requests and receive responses via web applications (e.g., in a web browser), make audio and video calls, and use the standard applications 806, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 820 and an output device 818.

INDUSTRIAL APPLICABILITY

The present disclosure relates generally to the implementation of a dynamically adjustable display 112 used by an operator of a genset 100 to view various conditions of the genset 100, although the presently disclosed subject matter may be used in other applications that use a display such as a vehicle, work machine, ship, and the like. The display 112 adjusts for light conditions that can affect the ability of an operator to properly view icons or text in the display 112. For example, a genset 100 can be used throughout a day, being operated from low light conditions of the morning to relatively brighter conditions of the midday and back to relatively lower light conditions of dusk or nighttime. Further, the genset 100 may be moved from one environment having one light condition, such as outside, to another environment with another light condition, such as underground. To account for changing ambient light conditions, the display 112 can use various hue configurations that are designed to increase the perceptibility of the text or icons in the various light conditions.

Additionally, the display 112 may be used to display one or more changing conditions of various components of the genset 100. In some examples, it may be desirable to draw the attention of an operator of the genset 100 to the particular condition. For example, a condition may be the temperature of an engine of the genset 100. If the temperature rises to a certain level, it may be preferable to draw the attention of the operator to the condition of the engine temperature to allow the operator to either note the condition or perform some action to ameliorate the condition. Thus, in these examples, the display 112 uses color codes that are designed to provide a prioritized contrast between icons having different levels of priority. Additionally, the color codes to provide the prioritized contrast between icons having different levels of priority can be selected to account for various levels of color blindness that the operator of the genset 100 may have. In some examples, the color codes may be default color codes. In other examples, the color codes may be selected by using the color blindness testing module 216, which allows an operator to select a particular set of color codes based using a testing process illustrated by way of example in FIG. 5.

Further, the display 112 may be configured to display elements, such as the elements 702, 704, and 706, in different colors representing different conditions but still maintain the same or similar contrast ratios. In some examples, having the same or similar contrast ratios can assist a user when viewing the elements representing a condition associated with the element. In the example illustrated in FIG. 7, the element 702 is displayed when a condition is within normal or expected operating parameters. The contrast ratio B may be lower than the other elements to represent a lower priority condition. However, if a condition continues to the elements 704 or 706, the condition indicates the potential need for the attention of the user. Thus, in these examples, the contrast ratios D and F are higher than the contrast ratio B of the element 702. Additionally, in some examples, the same or similar contrast ratio may be maintained to ensure the visibility of the elements 704 and 706 despite the use of different colors. For example, the icon background 714 of the element 704 may be yellow to indicate a warning but not an emergency condition, whereas the icon background 718 of the element 706 may be red to indicate an emergency condition.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A device, comprising:
a display having a first hue configuration and a second hue configuration, the display comprising a display background having displayed thereon a plurality of elements displayed in a first relative contrast, wherein at least one of the plurality of elements comprises a first contrast ratio between an icon and an icon background of the at least one of the plurality of elements and a second contrast ratio between the icon background and the display background, and wherein the first contrast ratio and the second contrast ratio are a same or a similar contrast ratio;
a display controller comprising:
a memory storing computer-executable instructions; and
a processor in communication with the memory, the computer-executable instructions causing the processor to perform acts comprising:
detecting an environmental condition;
adjusting the display to the first hue configuration or the second hue configuration in response to the environmental condition;
receiving an input that a first icon of the plurality of elements is a priority to an operation of the device; and
modifying the display from the first relative contrast to a second relative contrast, wherein in the second relative contrast, the first icon of the plurality of elements has a higher contrast relative to at least a remaining portion of the plurality of elements.

2. The device of claim 1, wherein the computer-executable instructions for detecting the environmental condition comprises computer-executable instructions that cause the processor to perform acts comprising:
detecting an ambient light condition around the display;
determining if the ambient light condition is a first brightness or a second brightness; and
adjusting the display to the first hue configuration in response to determining that the ambient light condition is the first brightness.

3. The device of claim 2, wherein the computer-executable instructions for detecting the environmental condition further comprises computer-executable instructions that cause the processor to perform acts comprising adjusting the display to the second hue configuration in response to determining that the ambient light condition is the second brightness.

4. The device of claim 1, wherein the computer-executable instructions for detecting the environmental condition comprises computer-executable instructions that cause the processor to perform acts comprising:
adjusting the display to a first test contrast;
adjusting the display to a second test contrast; and
receiving an input selecting the first test contrast or the second test contrast to be used as the first relative contrast.

5. The device of claim 4, wherein the first test contrast and the second test contrast are configured to test for a level of color blindness of an operator of the device.

6. The device of claim 1, wherein the computer-executable instructions further comprise computer-executable instructions that cause the processor to perform acts comprising:
receiving a second input that the first icon of the plurality of elements is not a priority to the operation of the device; and
modifying the display from the second relative contrast to the first relative contrast.

7. The device of claim 1, wherein the computer-executable instructions for receiving the input that the first icon of the plurality of elements is the priority to the operation of the device comprises computer-executable instructions that cause the processor to perform acts comprising:
detecting a first condition of a first function of the device;
determining that the first condition of the first function is a higher priority relative to a second condition of a second function of the device, wherein the first function is associated with the first icon and the second function is associated with a second icon of the plurality of elements; and
in response to determining that the first condition of the first function is the higher priority relative to the second condition of the second function of the device, modifying the display from the first relative contrast to a second relative contrast.

8. The device of claim 7, wherein the display controller further comprises computer-executable instructions that cause the processor to perform acts comprising:
detecting a second condition of the first function of the device;
determining that the second condition of the first function is a same priority relative to the second condition of the second function of the device; and
in response to determining that the first condition of the first function is the same priority relative to the second condition of the second function of the device, modifying the display from the second relative contrast to the first relative contrast.

9. A method of operating a display of a device, the method comprising:
detecting an environmental condition;
adjusting the display to a first hue configuration or a second hue configuration in response to the environmental condition;
receiving an input that a first icon of a plurality of elements is a priority to an operation of the device; and
modifying the display from a first relative contrast to a second relative contrast, wherein in the second relative contrast, the first icon of the plurality of elements has a higher contrast relative to at least a remaining portion of the plurality of elements.

10. The method of claim 9, wherein detecting the environmental condition comprises:
detecting an ambient light condition around the display;
determining if the ambient light condition is a first brightness or a second brightness; and
adjusting the display to the first hue configuration in response to determining that the ambient light condition is the first brightness.

11. The method of claim 10, further comprising adjusting the display to the second hue configuration in response to determining that the ambient light condition is the second brightness.

12. The method of claim 9, wherein detecting the environmental condition comprises:
adjusting the display to a first test contrast;
adjusting the display to a second test contrast; and
receiving an input selecting the first test contrast or the second test contrast to be used as the first relative contrast.

13. The method of claim 12, wherein the first test contrast and the second test contrast are configured to test for a level of color blindness of an operator of the device.

14. The method of claim 9, further comprising:
receiving a second input that the first icon of the plurality of elements is not a priority to the operation of the device; and
modifying the display from the second relative contrast to the first relative contrast.

15. The method of claim 9, wherein receiving the input that the first icon of the plurality of elements is the priority to the operation of the device comprises:
detecting a first condition of a first function of the device;
determining that the first condition of the first function is a higher priority relative to a second condition of a second function of the device, wherein the first function is associated with the first icon and the second function is associated with a second icon of the plurality of elements; and
in response to determining that the first condition of the first function is the higher priority relative to the second condition of the second function of the device, modifying the display from the first relative contrast to a second relative contrast.

16. The method of claim 15, further comprising:
detecting a second condition of the first function of the device;
determining that the second condition of the first function is a same priority relative to the second condition of the second function of the device; and
in response to determining that the first condition of the first function is the same priority relative to the second condition of the second function of the device, modifying the display from the second relative contrast to the first relative contrast.

17. A non-transitory computer-readable media storing computer-executable instructions that, when executed by one or more processors, cause the one or more processors to perform operations comprising:
detecting a first machine condition;
displaying a first element associated with the first machine condition on a display having a display background, wherein the first element comprises a first icon and a first icon background, and wherein a first contrast ratio between the first icon and the first icon background is a same or a similar contrast ratio to a second contrast ratio between the first icon background and the display background;
detecting a second machine condition; and
displaying a second element associated with the second machine condition on the display having the display background, wherein the second element comprises a second icon and a second icon background, and wherein a third contrast ratio between the second icon and the second icon background is the same or similar to a fourth contrast ratio between the second icon background and the display background.

18. The non-transitory computer-readable media of claim 17, further comprising computer-executable instructions that, when executed by one or more processors, cause the one or more processors to perform operations comprising:
detecting an ambient light condition around a display of a device;
determining if the ambient light condition is a first brightness or a second brightness; a adjusting the display to a first hue configuration in response to determining that the ambient light condition is the first brightness and adjusting the display to a second hue configuration in response to determining that the ambient light condition is the second brightness;
receiving an input that a first icon of a plurality of elements is a priority to an operation of the device; and
modifying the display from a first relative contrast to a second relative contrast, wherein in the second relative contrast, the first icon of the plurality of elements has a higher contrast relative to at least a remaining portion of the plurality of elements.

19. The non-transitory computer-readable media of claim 18, wherein the computer-executable instructions for receiving the input that the first icon of the plurality of elements is the priority to the operation of the device comprises computer-executable instructions that, when executed by one or more processors, cause the one or more processors to perform operations comprising:
detecting a first condition of a first function of the device;
determining that the first condition of the first function is a higher priority relative to a second condition of a second function of the device, wherein the first function is associated with the first icon and the second function is associated with a second icon of the plurality of elements; and
in response to determining that the first condition of the first function is the higher priority relative to the second condition of the second function of the device, modifying the display from the first relative contrast to a second relative contrast.

20. The non-transitory computer-readable media of claim 19, further comprising computer-executable instructions that, when executed by one or more processors, cause the one or more processors to perform operations comprising:
detecting a second condition of the first function of the device;
determining that the second condition of the first function is a same priority relative to the second condition of the second function of the device; and
in response to determining that the first condition of the first function is the same priority relative to the second condition of the second function of the device, modifying the display from the second relative contrast to the first relative contrast.

* * * * *